United States Patent
Rettberg et al.

(10) Patent No.: US 11,845,131 B2
(45) Date of Patent: Dec. 19, 2023

(54) METHOD FOR MANUFACTURING OR FOR REPAIRING A COMPONENT OF A ROTARY MACHINE AS WELL AS A COMPONENT MANUFACTURED OR REPAIRED USING SUCH A METHOD

(71) Applicant: Sulzer Management AG, Winterthur (CH)

(72) Inventors: Robin Rettberg, Winterthur (CH); Bruno Maroccia, Winterthur (CH)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 17/860,914

(22) Filed: Jul. 8, 2022

(65) Prior Publication Data
US 2022/0341326 A1    Oct. 27, 2022

Related U.S. Application Data

(60) Division of application No. 16/944,536, filed on Jul. 31, 2020, now Pat. No. 11,401,813, which is a (Continued)

(30) Foreign Application Priority Data

Sep. 22, 2016  (EP) ..................................... 16190145
Mar. 28, 2017  (EP) ..................................... 17163325

(51) Int. Cl.
*B23P 15/00*     (2006.01)
*B23P 15/04*     (2006.01)
(Continued)

(52) U.S. Cl.
CPC .............. *B22F 5/009* (2013.01); *B22F 10/80* (2021.01); *B23K 9/044* (2013.01); *B23K 9/167* (2013.01);
(Continued)

(58) Field of Classification Search
CPC .......... F01D 5/005; F01D 5/048; B22F 5/009
See application file for complete search history.

(56) References Cited

U.S. PATENT DOCUMENTS

| | | |
|---|---|---|
| 5,794,338 A | 8/1998 | Bowden, Jr. et al. |
| 6,269,540 B1 | 8/2001 | Islam et al. |
| | (Continued) | |

FOREIGN PATENT DOCUMENTS

| | | |
|---|---|---|
| DE | 102004043746 A1 | 3/2006 |
| EP | 2022987 A1 | 2/2009 |
| | (Continued) | |

OTHER PUBLICATIONS

FR2901305 English translation (Year: 2007).*
(Continued)

*Primary Examiner* — Jason L Vaughan
*Assistant Examiner* — Amanda Kreiling
(74) *Attorney, Agent, or Firm* — GLOBAL IP COUNSELORS, LLP

(57) ABSTRACT

A component of a rotary machine extends to an axial direction and a radial direction vertical thereto, and has an inner channel, extending from a first end of a core of a center of the component and to a second end at a radial limiting surface of the component and which is at least partially closed. A blank includes the core of the component and is limited by an outer surface in the radial direction. The blank is subtractively processed in a first subtractive process step, such that an outer contour is elaborated in the area of the outer surface, which extends in the radial direction, and a part of the channel is manufactured, which radially extends in the blank to the first end. The channel is formed by a build-up process on the blank.

12 Claims, 5 Drawing Sheets

Related U.S. Application Data continuation of application No. 15/699,241, filed on Sep. 8, 2017, now Pat. No. 10,851,653.

(51) Int. Cl.

| | | |
|---|---|---|
| *B22F 5/00* | (2006.01) | |
| *B23K 9/04* | (2006.01) | |
| *F01D 5/04* | (2006.01) | |
| *F04D 29/22* | (2006.01) | |
| *F04D 29/28* | (2006.01) | |
| *B23K 9/173* | (2006.01) | |
| *B23K 26/342* | (2014.01) | |
| *B23K 10/02* | (2006.01) | |
| *F04D 29/02* | (2006.01) | |
| *B23K 9/167* | (2006.01) | |
| *B33Y 10/00* | (2015.01) | |
| *B22F 10/80* | (2021.01) | |
| *B23P 6/00* | (2006.01) | |
| *F01D 5/00* | (2006.01) | |
| *B23K 103/08* | (2006.01) | |
| *B23K 101/00* | (2006.01) | |
| *B23K 103/04* | (2006.01) | |
| *B23K 103/18* | (2006.01) | |
| *B23K 103/14* | (2006.01) | |
| *B23K 103/10* | (2006.01) | |
| *B23K 103/00* | (2006.01) | |
| *B33Y 80/00* | (2015.01) | |
| *B22F 10/28* | (2021.01) | |

(52) U.S. Cl.
CPC ............ *B23K 9/173* (2013.01); *B23K 10/027* (2013.01); *B23K 26/342* (2015.10); *B23P 6/007* (2013.01); *B23P 15/006* (2013.01); *B23P 15/04* (2013.01); *B33Y 10/00* (2014.12); *F01D 5/005* (2013.01); *F01D 5/048* (2013.01); *F04D 29/023* (2013.01); *F04D 29/026* (2013.01); *F04D 29/2222* (2013.01); *F04D 29/284* (2013.01); *B22F 10/28* (2021.01); *B23K 2101/001* (2018.08); *B23K 2103/04* (2018.08); *B23K 2103/08* (2018.08); *B23K 2103/10* (2018.08); *B23K 2103/14* (2018.08); *B23K 2103/26* (2018.08); *B23K 2103/42* (2018.08); *B23P 2700/06* (2013.01); *B33Y 80/00* (2014.12); *F05D 2230/10* (2013.01); *F05D 2230/31* (2013.01); *F05D 2230/80* (2013.01)

(56) References Cited

U.S. PATENT DOCUMENTS

| | | |
|---|---|---|
| 9,174,426 B1 | 11/2015 | Dowd |
| 2008/0173624 A1 | 7/2008 | Drechsler et al. |

FOREIGN PATENT DOCUMENTS

| | | | |
|---|---|---|---|
| EP | 2012957 B | 1/2010 | |
| EP | 2669042 A1 | 12/2013 | |
| EP | 2957380 A2 | 12/2015 | |
| FR | 2901305 A1 * | 11/2007 | ............... B21K 3/04 |
| FR | 2901305 A1 | 11/2007 | |
| JP | 410180442 A | 7/1998 | |
| JP | 2004308647 A | 11/2004 | |
| JP | 2004314168 A | 11/2004 | |
| RU | 2450167 C2 | 5/2012 | |
| RU | 2578921 C2 | 3/2016 | |
| WO | 2006026962 A1 | 3/2006 | |
| WO | 2014074379 A1 | 5/2014 | |

OTHER PUBLICATIONS

Extended European Search Report dated Mar. 14, 2017 in corresponding European Patent Application No. 16190145.9, filed Sep. 22, 2016.

Fritz Klocke, et al., "Turbomachinery Component Manufacture by Application of Electrochemical, Electro-Physical and Photonic Processes", CIRP Annals—Manufacutring Technology, Bd. 63, Nr. 2, XP029041329, Dec. 31, 2014, p. 703-726.

* cited by examiner

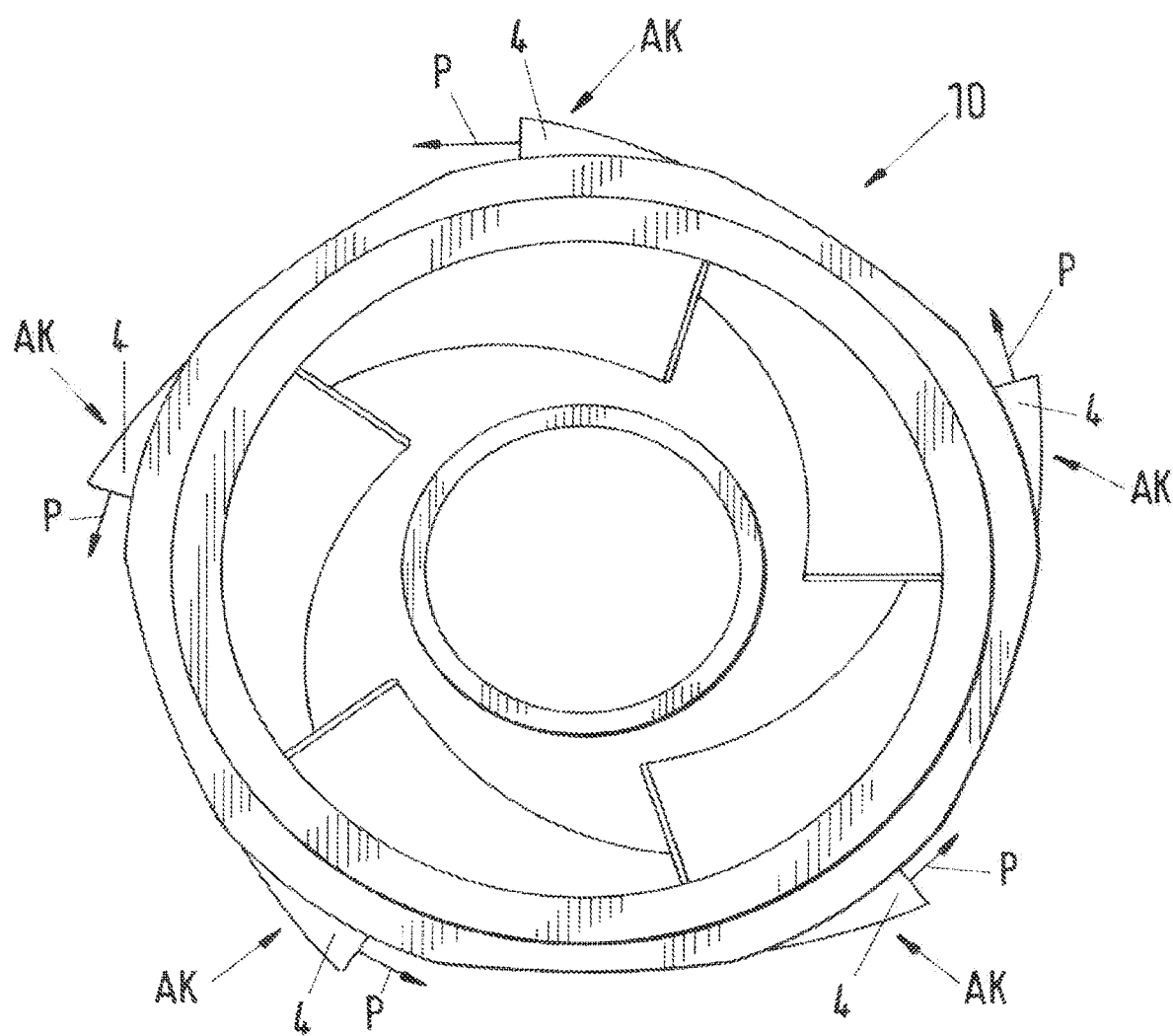

METHOD FOR MANUFACTURING OR FOR REPAIRING A COMPONENT OF A ROTARY MACHINE AS WELL AS A COMPONENT MANUFACTURED OR REPAIRED USING SUCH A METHOD

CROSS-REFERENCE TO RELATED APPLICATION

This application is a divisional of U.S. patent application Ser. No. 16/944,536, filed Jul. 31, 2020, which is a continuation application U.S. patent application Ser. No. 15/699,241, filed Sep. 8, 2017, now U.S. Pat. No. 10,851,653, issued Dec. 12, 2020, which claims priority to European Application No. 16190145.9, filed Sep. 22, 2016 and European Application No. 17163325.8, filed Mar. 28, 2017, the contents of each of which are hereby incorporated by reference.

BACKGROUND

Field of the Invention

The disclosure relates to a method for manufacturing a component of a rotary machine. The disclosure further relates to a method for repairing a component of a rotary machine, as well as to a component of a rotary machine manufactured or repaired using such a method.

Background of the Invention

In the manufacturing of rotary machines such as e.g. pumps, turbines, compressors, compactors or expanders, it is known to elaborate rotating rotors, pump impellers, impellers as well as stationary diffusers or guide wheels as a component out of a blank by a machining process or by a cutting process, for example by milling. In doing so, the blank can be present as a solid material or can already be preprocessed by a primary shaping process.

Such a method is known from EP-B-2 012 957, for example. This method is in particular characterized by allowing a machining manufacturing of the component, that is to say that the component is at least essentially brought into the desired final form as a whole out of the blank by a machining device. The assembling of preprocessed parts of the component, for example by welding, is no longer necessary with such integral manufacturing. This is particularly advantageous because welding seams or other joints can be a weak spot at highly loaded parts of the component in the operating state, the weak spot can be the cause of a crack or other damage of the component, for example due to corrosion.

SUMMARY

Hence, a machining manufacturing without assembling individual parts is advantageous, in particular in the case of highly loaded components. That is why, such components as, for example rotors (impellers) of pumps are made of solid material, depending on the application, e.g. of high-strength stainless steels, super alloys, other suitable metals or metal alloys or also of non-metallic materials, for example ceramic materials, and the vanes and channels of the impeller are elaborated out of this material by cutting processes, for example by milling.

As already explained in EP-B-2 012 957, sometimes a machining manufacturing of the component as a whole is not possible for purely geometrical reasons. This can be the case, for example, when the rotors (impeller) are designed as covered or closed impellers. In such a design the impeller comprises a shroud, on which the vanes are arranged and also a cover plate covering the vanes completely or at least partially at the side facing away from the shroud. Hence, at least partially closed channels are formed between the vanes, the channels each extending from the center of the impeller to its outer radial limiting surface.

Even if considering that these channels could be milled out of the blank or processed by machining on both sides, respectively, that means from the interior of the impeller and also from its radial limiting surface by a machining device, it is obvious, that geometry is here subject to limits and in many cases a machining manufacturing as a whole is impossible or at least uneconomic.

In such cases, if it is no longer possible or practicable to mill the impeller as a whole out of solid material for purely geometrical reasons, it is the state of the art to elaborate initially the shroud and the vanes out of a blank by machining. Then, the channels between the vanes are completely open channels, which can be manufactured in a simple way. Afterward the cover plate is placed and joined to the shroud or the vanes, respectively, for example by welding.

Alternatively, it is also known, to manufacture the areas of the channels, which cannot be milled, by an eroding method, for example by electrical discharge machining (EDM: electrical discharge machining). However, these methods are generally comparatively slow and expensive.

It is also state of the art to manufacture such components having inner channels by casting, wherein the inner channels are manufactured by an appropriate design of the mold or of the casting core, respectively. However, a cast component has the disadvantage that defects can arise during casting, for example in the structural conditions, having negative effects on the resilience and the stability of the component. Additionally, the surface qualities that can be achieved as well as the dimensional accuracy of areas, which cannot be milled are normally limited during the casting process.

In EP-A-2 669 042 a method for a machining manufacturing of a closed impeller is proposed, dividing the component (impeller) to be processed in two sub-volumes, which meet at a separating surface. As a result, the sub-volumes are defined such, that the separating surface comprises or intersects no limiting surfaces of the channels and that the channels can be elaborated by a machining method, for example by milling, as a whole out of the first subvolume later comprising the completed channels. The second sub-volume, being then only a part of the cover plate, is either manufactured as a separate part and joined to the first subvolume after finishing or the second sub-volume is built on the first sub-volume by an additive processing method, for example, by build-up welding. Thus, it should be possible to manufacture the channels completely by machining manufacturing. However, this method is still subject to geometrical limitations.

This problem explained by closed impellers is also present with other components having an inner channel, which position or geometry is such, that a machining manufacturing as a whole is not possible and not practicable, in particular for geometrical reasons. Examples mentioned here are closed guide wheels, diffusors or also cooling channels in turbine blades, for example for cooling air.

Based on this state of the art, it is therefore an object of an embodiment of the invention proposing another method for manufacturing a component of a rotary machine, which component has at least one inner channel, by which method, in particular, such components can be manufactured which do not allow machining manufacturing of the channel as a whole for geometrical reasons. Furthermore the disclosure is expected to propose a corresponding component.

The objects of the disclosure meeting this problem are characterized by the features of disclosed herein.

According to an embodiment of the invention, a method for manufacturing a component of a rotary machine is proposed, the component extending in an axial direction as well as in a radial direction vertical thereto and having at least one inner channel, which extends from a first end of a core of a center of the component and to a second end at a radial limiting surface of the component and which is at least partially closed, wherein a blank is provided, comprising the core of the component and which blank is limited by an outer surface in the radial direction, wherein the blank is subtractively processed in a first subtractive process step in such a manner, that an outer contour is elaborated in the area of the outer surface, which outer contour extends at least in the radial direction, as well that a part of the channel is manufactured which part at least partially extends radially in the blank to the first end and then the channel is finished by a build-up process on the blank.

Within the framework of the disclosure, the core presents the area of the component where the inner channel joins a middle area of the component. Preferably, but not necessary, the core comprises the axial axis A, parts of the vanes, as well as parts of the shroud and of the cover plate.

Thus, the method according to an embodiment of the invention combines a subtractive process, wherein material is removed from the blank, with an additive or build-up process, wherein material is applied, in an advantageous manner. In this case, only a part of the channel is manufactured by a machining process, as the rest of the channel is generated by a buildup process. Of course, particularly preferred, a subtractive process step for fine machining can also be performed between two build-up sub-steps. Due to this combination, it is possible to generate a channel with— at least almost—any desired geometry.

Here a build-up process is a process, wherein the process takes place directly out of a shapeless or a neutrally shaped material, for example by melting.

As an outer contour is elaborated in the area of the outer surface by a subtractive process, which contour extending at least in the radial direction, it is possible finishing the channel by the build-up process on the blank in an optimal way. Hence, it is particularly ensured, that the material can be reliably applied in the build-up process, because the material application can be made at an optimal angle. This has a positive effect on the optimal manufacturing of the channel as well as on the usage of the material to be applied.

Thus, the outer contour has an outer contour surface, which surface normal extends at an angle from 0 to 180° to the radial direction. The channel can be built up and finished over the outer contour surface in direction of the surface normal.

As the dimension of the outer surface of the blank in the radial direction is smaller than the dimension of the limiting surface of the finished component in the radial direction, particularly the radial exterior parts of the component are manufactured by the build-up process, for example the part of the channel adjoining the limiting surface and which part comprises the second end of the channel. This build-up process in the radial direction has particularly the advantage, that then usually no or only slightly overlapping structures have to be manufactured during the build-up process, which is particularly advantageous regarding the procedural aspects.

As the blank is not processed by casting, the blank may advantageously include a forged material, which is then processed by machining. All advantages of the forged material are maintained by the machining process. In doing so, the outer contour in the area of the outer surface, which contour extends at least in the radial direction, is manufactured by machining in the first subtractive process step as well as a part of the channel, which radially extends in the blank, at least partially, to the first end. Hence, after completing the first subtractive process step the outer contour extending in the radial direction and a part of the channel is finished, which starts at a first end of a core of a center of the blank or of the component, respectively, and which channel extends to the outer surface of the blank. The first subtractive process step may either comprise a milling from the outer surface of the blank or a milling from the center of the blank. In particular it is also possible, that the first subtractive process step comprises both a milling or a machining process, respectively, out of the center and also a milling from the outer surface of the blank.

After completing the first subtractive process step, the channel is finished by a buildup process and the component is brought into its final form.

According to a particularly preferred embodiment, the first subtractive process step is performed that way, that the outer contour comprises parts of a cover plate of the component and/or parts of a shroud of the component. Hereby, the finishing of the channel is substantially simplified by the build-up process, because a higher percentage of the surface is available for applying the material.

The build-up process is preferably performed layer by layer. So it is possible, that the build-up process is performed layer by layer at least in a direction vertical to the axial direction. Of course, it also is possible, that the build-up process is additionally performed layer by layer in the axial direction. Furthermore, it also is possible that the build-up process is additionally performed layer by layer in a peripheral direction extending at an angle Alpha relative to the radial direction. In doing so, the angle Alpha is 0 to 180°, preferred 30° to 150°, particularly preferred 60 to 120°.

In a preferred embodiment, the component comprises a plurality of inner channels, with each channel extending from the first end from the core of the blank to a second end at the radial limiting surface of the component, wherein adjacent channels are respectively separated by a separating wall. Thereby, in each case one part of the channel of each channel is manufactured in the first subtractive process step, which part extending from the respective first end of the channel into the outer surface of the blank and wherein each separating wall and each channel is only finished by a build-up process.

Preferably, the blank is a solid, and in particular a rotationally symmetric, body. But a cylindrical axial and through bore can preferably be disposed in the center of the blank, which bore is used, for example, to fix the finished component on a shaft, e.g. on a driveshaft of a pump. i.e. the blank preferably has a central bore before the first subtractive process step, which bore is arranged radially inwardly such, that in the finished state of the component each first end of a channel being arranged in the center is separated from the central bore by an annular body.

A further preferred measure is, that the build-up process comprises several additive process steps, in order to successively build up the component. It is particularly preferred, if at least one further subtractive process step is performed between the additive process steps. In this further subtractive process step, the structure, which has been built up in the preceding additive process step, can be reprocessed, for example by milling, by grinding or by polishing. By this measure, a surface optimization can be realized or a particularly good geometric fidelity can be achieved.

Nowadays processing devices are known, with which additive processes, for example laser build-up welding, as well as also subtractive processes, for example milling or grinding, can be performed. Such devices have different processing heads, for example, which are automatically changeable, wherein one processing head is designed for laser build-up welding, for example, whereas another processing head is designed for milling. Especially such processing devices allow a fast and easy change between subtractive and additive processing methods without the workpiece to be processed being re-clamped or transferred into another processing station. This allows a particularly rapid, cost-effective and high-quality manufacturing of components, which are processed very precisely.

A possible variant is, that the component is built up part by part after the first subtractive process step, and wherein preferably first of all only each separating wall is completed. Thus, for example, after completing the first subtractive process step, at first all separating walls between the channels are completely built up and then the still missing parts are built up, e.g. those which turn the channels into closed channels.

It is particularly preferred for procedural reasons that the build-up process is performed by a laser. The method by laser build-up welding is particularly suited for the buildup process.

The applications are particularly relevant for practical use, if the component is designed as an impeller, as a guide wheel or as a diffusor of a rotary machine, in particular of a pump, of a turbine, of a compressor, of a compactor or of an expander.

It has been shown, that the method, according to embodiments of the invention, also can be very advantageously used in a corresponding similar manner for repairing damaged or worn out components of a rotary machine. According to this, the disclosure also proposes a method for repairing a component of a rotary machine, which component extending in an axial direction as well as in a radial direction vertical thereto, and comprising a plurality of inner channels, each of which extending from a first end in the center of the component to a second end at the radial limiting surface of the component, wherein adjacent channels are respectively separated by a separating wall, and damaged areas of the component at the limiting surface or at one of the channels or at one of the separating walls are identified, wherein furthermore a blank is manufactured by a machining removal or by a separating removal of the damaged areas, the blank comprising a core of the center of the component and wherein the removed damaged areas are replaced by a build-up process on the blank in order to manufacture the final form of the component.

According to an embodiment of the invention, the blank is subtractively processed in a first subtractive process step in such a manner, that an outer contour is elaborated in the area of the outer surface, which outer contour extends at least in the radial direction. Then, the channels are finished on the blank by a build-up process, wherein preferably, all removed damaged areas are additionally replenished again by the build-up process.

Regarding the method, according to an embodiment of the invention, for repairing a component, a blank is manufactured in a corresponding similar manner as in the method for manufacturing a component, on which blank the missing parts or areas of the component subsequently are manufactured by a build-up process. Regarding the method for repairing, the blank is generated by removing the damaged areas of the component. After manufacturing the blank by removing the damaged areas, the blank corresponds to the blank manufactured by the method for manufacturing the component, in principle, after performing the first subtractive process step.

The removal of the damaged areas can be made by a machining method, for example by milling or by turning. Alternatively or complementary, it is possible to remove the damaged parts by a separating process, for example by punching, by cutting, by torch cutting or by sawing.

A further advantageous measure for the method for manufacturing a component as well as for the method for repairing a component is, that at least one material is used for the build-up process, the material being different from the material of the blank. Regarding the build-up process, one ore more different materials or substances, respectively, can be used in order to optimize the properties of the component in its predetermined areas in a selective way. It is possible, for example, manufacturing those areas of the component which are exposed to highest loads in the operating state out of a particularly hard or of a particularly wear-resistant or of a particularly corrosion-resistant material. Regarding the impeller of a pump, those particularly overloaded areas, for example, are the radial exterior parts of the separating walls (vanes) between the channels, thus the trailing edges of the vanes as well as the area of the radial limiting surface of the impeller. These areas can be made of a particularly wear-resistant material in the build-up process.

Of course, it is also possible to change the material during the build-up process, thus, for example, initially to use a material during the build-up process, the material being the same as the material of the blank, for example, and then using a different material thereof, for example for the radial exterior areas of the component.

In this way, it is also possible to generate a layer on individual parts or areas of the component by a build-up process, for example a wear protection coating.

Thus, due to this measure it is possible, for example, to realize a higher hardness of the component at wear surfaces of the component in a selective way. Hereby the service life of the component is increased. Regarding the impeller of a pump it is also in particular possible to do without a wear ring and to replace it by a coating, generated by the build-up process.

A component of a rotary machine is further proposed by the disclosure, the component being manufactured or repaired by a method according to the invention.

According to a preferred embodiment of the component, each separating wall is designed as a vane.

The designs are particularly relevant for practical use, if the component is in particular designed as an impeller, as a guide wheel or as a diffusor of a rotary machine, in particular of a pump, of a turbine, of a compressor, of a compactor or of an expander.

Further advantageous measures and designs of the disclosure result from the dependent claims.

BRIEF DESCRIPTION OF THE DRAWINGS

An embodiment of the invention will be explained in more detail hereinafter with reference to the drawings.

FIG. 5 is a top view of the blank from FIG. 4.

DETAILED DESCRIPTION OF THE EMBODIMENTS

The method according to embodiments of the invention is used for manufacturing a component of a rotary machine, the component having at least one inner channel, extending out of a center to a limiting surface of the component and which channel is at least partially closed. Here a closed channel is a channel, which is completely closed, except for an inlet or an outlet, so the channel has a tubular shape, that is to say, the channel is limited by one wall or by several walls anywhere, vertical to its main direction of flow. In contrast, an open channel means a channel, which is not limited by a wall in a direction vertical to its main direction of flow, thus in a direction vertical to its longitudinal extension, but it is open. So, for example, a channel with an U-shaped or a V-shaped wall is an open channel. If the open side of the U-profile or of the V-profile were covered with a plate, the channel would be a closed channel.

Figure 1:
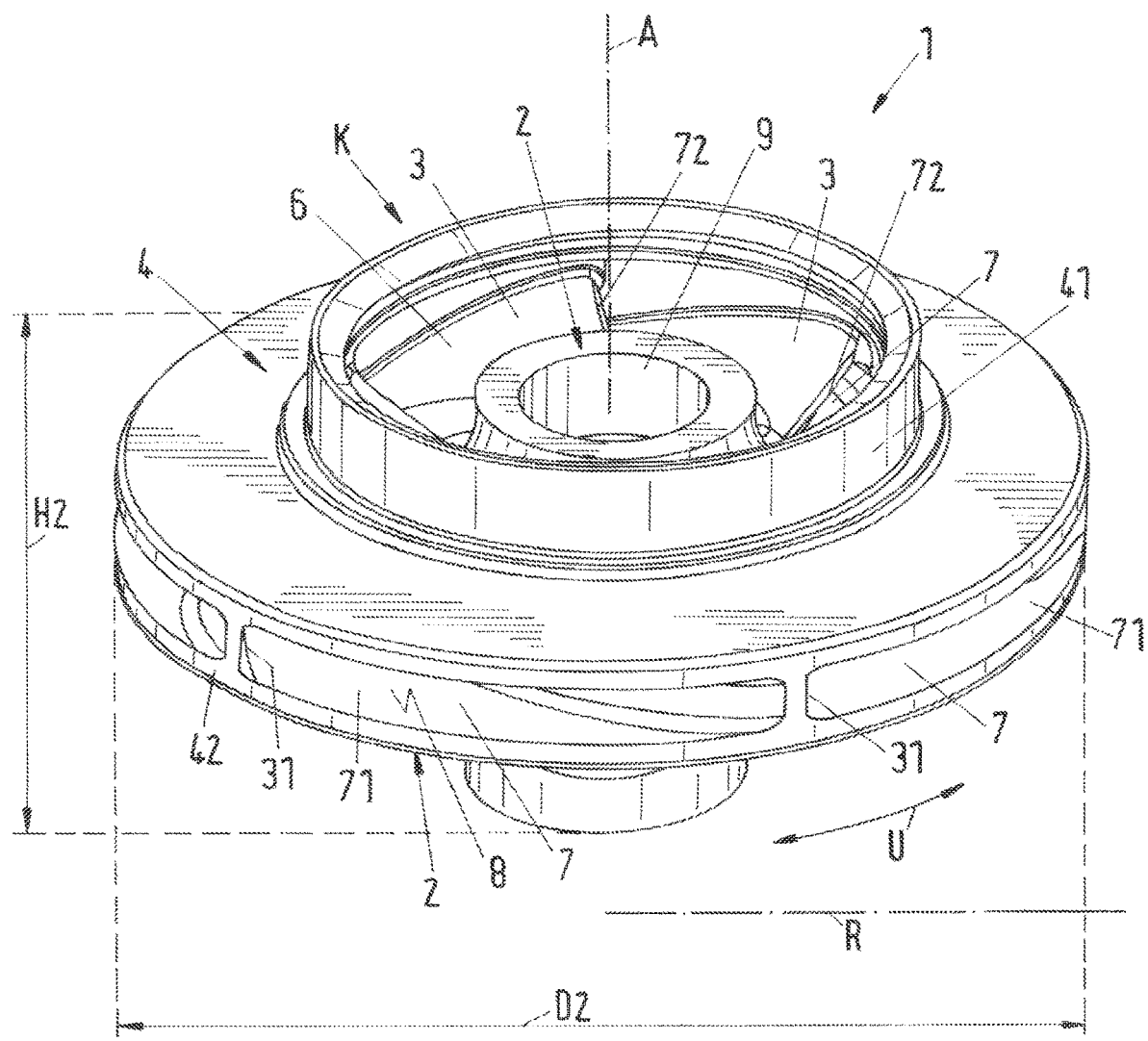
FIG. 1 is a perspective view of an embodiment of a component according to the invention, the component being manufactured according to an embodiment of a method disclosed herein.

A partially closed channel means a channel, which is partially designed as a closed channel and partially as an open channel. In the following description of embodiments of the invention it is referred to an important example for practice with an exemplary nature, wherein the component is a closed or a covered rotor (impeller), respectively, of a turbo engine, e.g. of a pump. For a better understanding, FIG. 1 illustrates a perspective view of an embodiment of a component according to the invention, the component being a closed impeller and which is entirely provided with the reference sign 1. The impeller 1 can be manufactured by a method according to an embodiment of the invention.

The component 1 or the impeller 1, respectively, extends in an axial direction A as well as in a radial direction R vertical thereto. The axial direction A usually means that direction which is determined by the axis of rotation of the rotary machine when the component 1 is installed in the rotary machine. The axis of rotation is that axis around which the rotor of the rotary machine rotates in the operating state.

The impeller 1 rotates around the axis of rotation in the operating state, which axis determines the axial direction A. A direction vertical to this axial direction A is described as radial direction R.

The impeller 1 is a rotationally symmetric component with respect to the axial direction A and comprises a shroud 2 in a manner known per se, with which the impeller 1 usually is mounted or fixed on an axis or a shaft, not shown here, and also a number of vanes 3, which are arranged on the shroud 2, as well as a cover plate 4 covering the vanes 3 at least partially at the side or edge, respectively, facing away from the shroud 2. According to the description (FIG. 1), the cover plate 4 extends higher than the shroud 2 with respect to the axial direction A. As a result according to the description, an internal space 6 is formed above the vanes 3, the space being limited by the cover plate 4 with respect to the radial direction R. This internal space 6 presents the inlet in the operating state, through which the fluid flows to the impeller 1. An inner channel 7 exists in each case between two adjacent vanes 3, which channel is designed as an at least partially closed channel 7 and here as a closed channel 7.

Each channel 7 extends from a first end 72 in a center of the impeller 1, which is formed by the internal space 6, to a respective second end 71 in a limiting surface 42 of the impeller 1. The limiting surface 42 presents the radially outer surface of the impeller 1, which surface extending parallel to the axial direction A, that is to say, the surface limiting the impeller 1 outwards in the radial direction R. "Parallel to the axial direction A" means, that each vector of the surface normal of the limiting surface 42 is vertical on the axial direction A. The limiting surface 42 comprises the radially outer surfaces of the cover plate 4 and of the shroud 2 as well as the radially outer closing edges of the vanes 3, which are called trailing edges 31.

Thus adjacent channels 7 are each separated by a separating wall 3, each separating wall 3 forming in each case one vane 3 of the impeller 1.

Depending on the design of the impeller 1 it is also possible, that the closing edges of the vanes 3 are displaced backward with respect to the radial direction, that means they are not in the limiting surface 42. Then, the cover plate 4 and/or the shroud 2 protrude over the vanes 3 or the closing edges of the vanes 3, respectively, with respect to the radial direction R. Such a design particularly is also possible regarding a rotor of a turbine, where the outer closing edges of the vanes 3 usually are the leading edges.

Hence, each of the closed channel 7 is enclosed by a limiting surface 8, in each case composing of the surfaces of two adjacent vanes 3 facing each other, as well as of the intermediate surface segments of the surfaces of the shroud 2 and of the cover plate 4 facing each other, which surface segments forming the bottom and the top of the respect channel 7. Thus the vanes 3 each form a separating wall between two adjacent inner channels 7. The second end 71 of each channel 7 comprises the port, with which the respective channel 7 joins the limiting surface 42. Adjacent second ends 71 in peripheral direction each are separated from each other by a trailing edge 31.

The impeller 1 also has a central axial through bore 9, which is used to receive a shaft or an axis, on which the impeller 1 is mounted.

An embodiment of the method according to the invention is explained in more detail below with reference to FIG. 2 to 5.

Figure 2:
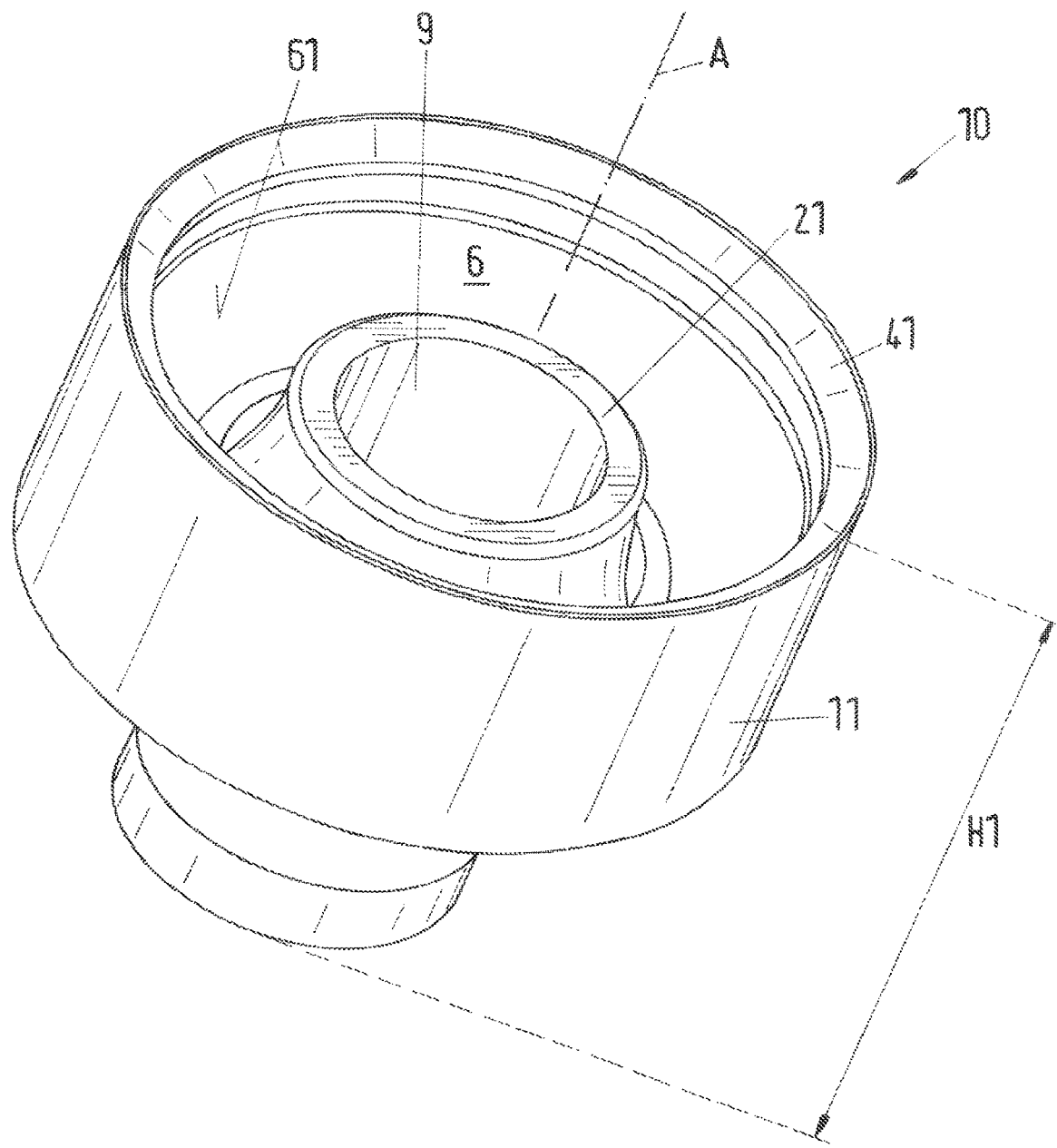
FIG. 2 is a perspective view of an embodiment of a blank for performing an embodiment of a method according to the invention.

According to the method according to an embodiment of the invention a blank is firstly provided. FIG. 2 illustrates in a perspective view an embodiment of such a blank, which is entirely provided with the reference sign 10. This blank 10 is designed for manufacturing the impeller 1, illustrated in FIG. 1. For a better understanding, FIG. 3 illustrates a sectional view of the blank 10 from FIG. 2 in a section in the axial direction A.

Figure 3:
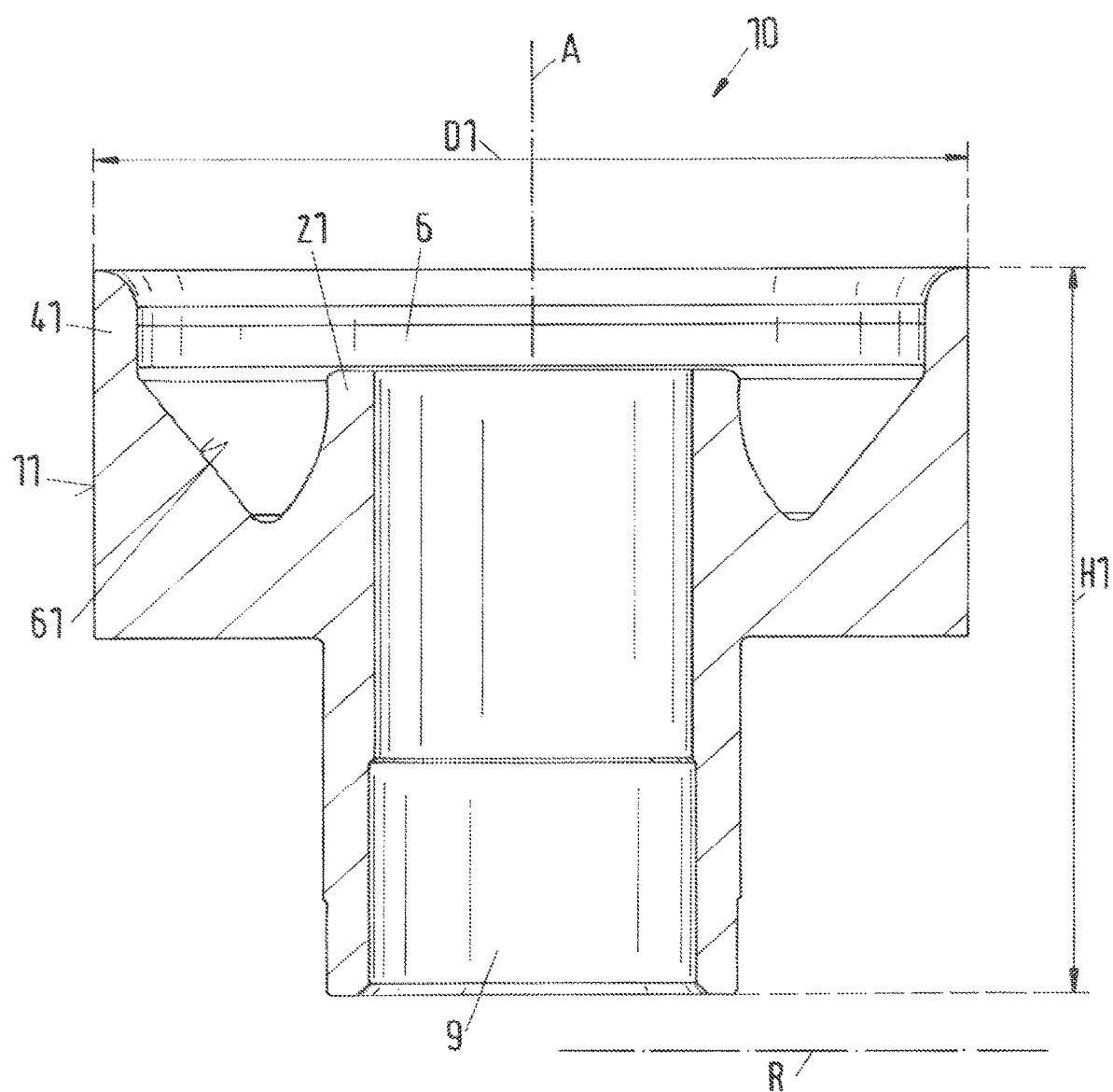
FIG. 3 is a sectional view of the blank from FIG. 2 in a section in the axiall direction.

The blank 10 is particularly preferred designed in a rotationally symmetric way with respect to the axial direction A, as also illustrated in FIG. 2 and FIG. 3.

The blank 10 has the central axial through bore 9, which is used to receive the shaft or the axis, on which the impeller 1 can be mounted. The bore 9 is limited in the area of its upper end (illustrated in FIG. 2) by an annular body 21, coaxially extending about the axial direction A. This annular body 21 forms a part of the shroud 2 in the finished state of the impeller 1.

The blank 10 further comprises the center formed by the internal space 6, which center presents the inlet of the impeller 1 in the operating state, through which the fluid flows to the impeller 1. The internal space 6 is designed as a cavity in the blank 10, which cavity rotationally symmetric and coaxially extending about the annular body 21. This cavity is radially inside limited by the annular body 21. Regarding the radial direction R external, the cavity forming the internal space 6 is limited by a cylindrical area 41, as well as by a substantially cone-mantle-shaped wall 61 joining the cylindrical area 41 below (illustrated in FIG. 3) in the axial direction A. The cylindrical area 41 as well as the wall 61 are coaxially arranged to the bore 9 and are rotationally symmetric regarding the axial direction A. The cylindrical area 41 forms a part of the cover plate 4 in the finished impeller 1 (see FIG. 1), namely that part limiting the internal space 6 in the radial direction.

The blank 10 is limited by an outer surface 11 in the radial direction R, which outer surface 11 is designed cylinder-mantle-shaped in this embodiment and which extends coaxially to the bore 9 about the axial direction A. Consequently, the dimension of the outer surface 11 in the radial direction R is the diameter D1 of the cylinder-mantle-shaped outer surface 11.

Naturally, such designs are also possible, wherein the radially external outer surface 11 of the blank 10 is not a cylinder mantle surface, but has another geometrical design, for example having the shape of a cone mantle surface or of a truncated cone mantle surface. In such cases, D1 indicates the maximum dimension of the outer surface 11 in the radial direction R, thus the maximum diameter, for example, which is enclosed by the outer surface 11.

The maximum dimension of the blank 10 in the axial direction A is described with the height H1. The height of the outer surface 11 of the blank 10 in the axial direction A may be smaller than or equal to this height H1.

The blank 10 is designed that way, that the diameter D1 of its outer surface 11 is smaller than the corresponding dimension of the limiting surface 42 in the radial direction R. The dimension of the limiting surface 42 in the radial direction R is the outer diameter D2 of the impeller 1 (see FIG. 1). Thus it is D1<D2.

The height H2 of the impeller 1 in the axial direction A (see FIG. 1) is its maximum extension in the axial direction A.

In this embodiment, the height H1 of the blank 10 is measured such, that the height is equal to the height H2 of the finished impeller, thus it is H1=H2. Of course, it can also be advantageous to measure the height H1 of the blank 10 smaller than the height H2 of the finished impeller. For example, a suitable choice of H1 can be made on the basis of the criterion how much volume of the component 1 is to be manufactured by a build-up process and which parts of the component 1 are to be manufactured already in the first subtractive process step. Of course, this depends on the specific geometry of the component 1 to be manufactured and on economic factors.

The outer surface 11 of the blank 10 is preferably designed as a coherent surface having no openings.

Particularly preferred, the blank 10 is made of a forged material, which may be a metal or a metal alloy. Thus, for example, steel is suitable in its known embodiments or aluminum, titanium, nickel, a nickel or cobalt base alloy or a non-ferrous metal. Of course, other than forged materials are also possible, for example a cast material, a synthetic material or a composite or another machinable material.

The blank 10 is preferably manufactured or processed in such a way, that parts of the shroud 2 as well as of the cover plate 4 are already designed in its desired final form or at least substantially in its final form. In that regard, "substantially" means that, of course, post-processings can be performed at a later stage, as for example milling, turning, grinding, polishing or something similar, but the substantial design is already completed in the blank 10. Preferably, at least the following parts of the blank 10 are designed that way, that they substantially have the final form of the completed impeller: the central axial bore 9, the annular body 21 as a part of the shroud 2, the cylindrical area 41 as a part of the cover plate 4, the internal space 6, which forms the center and which is realized by the cavity in the blank 10. Furthermore, in the embodiment described here, the height H1 of the blank 10 is already substantially identical to the height H2 of the impeller 1.

Figure 4:
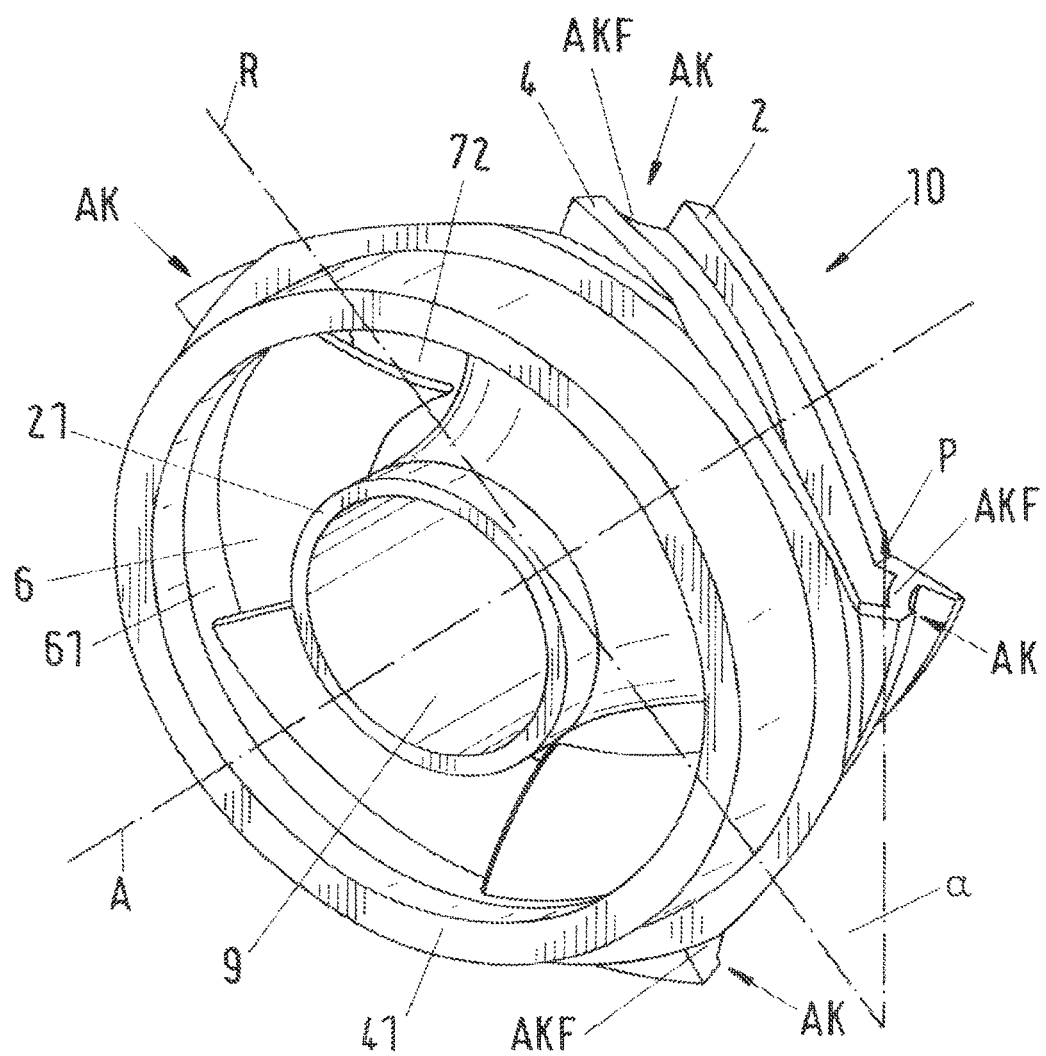
FIG. 4 is a perspective view of an embodiment of a blank after finishing the first subtractive process step.

Now a first subtractive process step is performed on this blank 10, which process step is explained below. FIG. 4 illustrates a perspective view of the blank 10 after finishing the first subtractive process step. Particularly, the first subtractive process step is performed by a machining process. For a better understanding, FIG. 5 additionally illustrates a top view of the blank from FIG. 4.

A subtractive process step means, that material is cut or removed, respectively, from the workpiece—here from the blank 10—in such a process step. As it is generally usual, a machining process means a process wherein excessive material is removed from the blank 10 or the workpiece, respectively, in the form of chips in order to achieve a desired geometrical form. For example, machining processes are milling, turning, drilling, planing, filing, grinding, honing or lapping, to mention only a few examples.

The first subtractive process step preferably comprises a milling by a machining device, comprising, for example a computer-controlled milling tool. Particularly preferred, the machining device is designed at least as an five-axes-milling tool, with which the desired geometrical form is elaborated out of the blank 10. The milling tool is usually guided by a manipulator, the guide being computer-assisted. The outer contours AK are elaborated in the area of the outer surface 11 in the first subtractive process step, which contours extending in the radial direction R. In doing so, the outer contours AK each include an outer contour surface AKF, which surface normal (in FIGS. 4 and 5 indicated with an arrow P) extends at an angle α from 0° to 90° to the radial direction R. Additionally, one part was manufactured of each channel 7, which part extends from the first end 72 of the respective channel into the outer surface 11 of the blank 10. The first end 72 of each channel 7 joins the wall 61, which is limiting the internal space 6. Thereby, the area of the port of each channel 7 into the outer surface 11 is designed as partially closed channel section. These ports are each milled into the outer surface 11.

That is, after finishing the first subtractive process step, the blank 10 comprises the outer contours AK in the area of the outer surface 11 (see FIG. 4 and FIG. 5), which contours extending in the radial direction, and a part of the channels, starting at a first end 72 of a core K of a center 6 of the blank and extending to the outer surface 11 of the blank 10. In the embodiment, the outer contours AK comprise parts of the cover plate 4 as well as parts of the shroud 2.

The parts of each channel 7 being manufactured in the first subtractive process step, that means in each case the channel section from the first end 72 of the channel in the wall 61 of the internal space 6 to the port of the respective channel into the outer surface 11 of the blank 10, are preferably manufactured in such a way, that they substantially have at least their final form.

Thus, the blank 10 already has at least substantially the final form of the completed impeller 1 apart from those areas of the impeller 1, which are arranged radially external with respect to the outer surface 11 of the blank 10.

It is understood, that the first subtractive process step can comprise a milling from the wall 61 or from the internal space 6, respectively, as well as a milling from the outer surface 11.

It is an advantage of the purely machining process, that a blank 10 made of a forged material retains all positive properties of the forged material.

After finishing the first subtractive process step, the still missing parts of the component 1 are manufactured by a build-up process and the component 1 is brought in its final form. FIG. 1 illustrates in a perspective view the finished component 1, here the covered impeller 1, which is manufactured out of the blank 10, illustrated in FIGS. 2 and 3.

A build-up process means a process, wherein a shapeless or a neutrally shaped material is applied. In doing so, the shapeless material, for example a powder, or the neutrally shaped material, for example a strap-shaped material, usually is melted in order to build up the still missing parts of the component 1 on the blank or on the already existing structure, respectively. Thus, a build-up process is a process out of a shapeless or a neutrally shaped material.

The build-up manufacturing comprises one ore several additive process step(s). An additive process step or an additive manufacturing, which is also referred to as generative manufacturing, respectively, means a process step, wherein material is added or applied on the workpiece, here the blank 10. The desired structures usually are generated, for example by a build-up process on a workpiece, in an additive manufacturing out of a shapeless material, for example liquids or powders, or out of a neutrally shaped material, for example strap-shaped or wire-shaped material, by chemical and/or physical processes. Additive manufacturing methods known per se for metallic workpieces are, for example build-up welding methods, in particular inert gas methods as tungsten inert gas welding (TIG) or laser build-up welding or plasma methods or selective laser melting (SLM selective laser melting) or selective laser sintering (SLS).

After finishing the first subtractive process step the still missing areas of the component 1 are generated by a build-up process, in particular these are the radial exterior parts of the separating walls 3 and of the channels 7, parts of the cover plate 4 as well as parts of the shroud 2. Additionally, parts of the annular body 21 and/or of the cylindrical area 41 are manufactured by the build-up process.

Thus, in this embodiment, at first the build-up process is started at the respective outer contour surfaces AKF of the respective outer contours AK and the channels 7 are finished. That is, the build-up process initially takes place in direction of the surface normal of the outer contour surfaces AKF. After finishing the channels 7, the component is then brought in its final form.

In a preferred embodiment, the still missing parts are generated in the build-up process by laser build up welding. The method of laser build-up welding with its different variants is well known to the person skilled in the art and, thus, no further explanations are required.

Hence, it is possible to perform the build-up process of the blank 10 layer by layer.

Another also preferred embodiment is to build up the component 1 part by part in the build-up process, i.e. the individual parts of the component 1 as e.g. the separating walls 3 or the covers of the channels 7 are successively built up in this sense, that first a part, e.g. the separating walls, is completely built up to its final state and then the next part is completely built up. This process is repeated until the component is finished. Furthermore, it is possible, that the individual parts of the component 1 are not completely built up, but only part by part, in other words first a part of the separating walls 3 is built up, then a part of the covers of the channels 7, then a part of the separating walls 3 again and so on. In doing so, a further subtractive process step can preferably be performed after a partial build up.

As already mentioned, according to a preferred embodiment the build-up process can comprise several additive process steps to build up the component 1 in a successive manner. Regarding this, it is particularly preferred performing at least one further subtractive process step between the additive process steps.

Deviations from the desired geometry can be compensated in such a further subtractive process step, for example by a machining process, which deviations have arisen in the preceding additive process step. Thus, for example, milling or grinding works can be performed in this further subtractive process step, in order to remove such material which was applied too much in the additive process step or in order to equalize or to grind junctions between adjacent layers or the like.

It is particularly preferred performing a further subtractive process step in each case between two additive process steps, i.e. the additive process steps and the further subtractive process steps are performed alternately or in turns, respectively. This ensures a particularly high quality and precision of the component 1.

Nowadays modern processing machines are known, with which subtractive process steps as well as additive process steps can be performed in the same process chamber without need to re-clamp the blank 10 or the component 1, respectively, or to put them into another holder. The blank 10 is only once clamped into a holder and then, the blank can be processed selectively or alternately in a subtractive or additive manner. Such processing machines comprise several processing heads for this purpose, at least one of them being designed for a subtractive process, for example as a milling tool, and at least one of them being designed for the additive process, for example as a device for laser build up welding. After finishing an additive process step, for example, the processing machine automatically changes the processing head and then it can perform a subtractive process step and vice versa. In doing so, a particularly fast and very precise manufacturing of the component 1 is possible.

An embodiment of the invention also proposes an analogously same method for repairing damaged or worn out components of a rotary machine. Regarding the method for repairing a components 1 of a rotary machine, for example the impeller 1 of a pump, it is proceeded in the analogously same manner as described above, but the blank 10 is generated out of a damaged or worn out, respectively, impeller 1. For example, this can be an impeller 1, whose trailing edges 31 of the vanes 3 or of the separating walls 3, respectively, or the radially outer areas of the channels 7 are damaged. Regarding the method, damaged areas of the component 1 are identified at the limiting area 42 or at the channels 7 or at a separating wall, further a blank 10 is manufactured by a machining or by a separating removal of the damaged areas, which blank comprising the center of the component 1, and the removed damaged areas are replaced by a build-up process on the blank 10 in order to manufacture the final form of the component 1.

The method according to an embodiment of the invention for repairing the component is particularly characterized in that the blank 10 is subtractively processed in a first subtractive process step that way, that an outer contour AK in the area of the outer surface 11 is elaborated, which outer contour extending at least in the radial direction. Then, the channels 7 are finished by a build-up process on the blank 10, wherein additionally, all removed damaged areas are preferably replaced again by a build-up process.

Regarding the method according to an embodiment of the invention for repairing a component the blank 10 is manufactured in an analogously same manner as in the method for manufacturing a component, on which blank the still missing parts or areas of the component 1 are subsequently manufactured by a build-up process. Regarding the method for repairing, here the blank 10 is generated by removing the damaged areas of the component. After manufacturing the blank 10 by removing the damaged areas, the blank corresponds in principle to the blank 10 manufactured by the method for manufacturing the component after performing the first subtractive process step (see FIG. 4 and FIG. 5).

The removal of the damaged areas can be performed by a machining method, for example by milling. Alternatively or additionally, it is also possible to remove the damaged areas by a separating process, as for example punching, cutting, torch cutting or sawing.

The illustrations regarding the method for manufacturing the component 1 including the advantageous measures and variants are also valid in a same or in an analogously same manner for the method for repairing the component 1.

Regarding the method according to an embodiment of the invention for manufacturing a component as well as the method according to an embodiment of the invention for repairing a component, it is possible to use one ore several materials for the build-up process, the materials being different from the material of which the blank is consisting. Of course, it is also possible to change the material during the build-up process, thus using different materials for the build-up process, for example up to four different materials. Thus, for example, a first material can be used for a first additive process step, the material being equal or different from the material of the blank 10 and then using a second material for a further additive process step, the material being different from the first material.

In this way, layers can be generated, for example wear protective coatings for protecting particularly such areas of the component where the highest loads arise in the operating state. Here such coatings can be generated directly on areas, which are manufactured in the subtractive process step, as well as on areas, which are generated in a preceding additive process step.

In this way, areas of the component can be optimized specifically with respect to hardness, wear resistance, corrosion resistance and so on.

Regarding the impeller of a pump it is possible, for example, the radially external areas of the separating walls (vanes) between the channels, hence the trailing edges of the vanes as well as the area of the radial limiting surface of the impeller. Then, these areas can be manufactured out of a particularly wear-resistant material in the build-up process. Of course, it is also possible to change the material during the build-up process, thus, for example, initially using a material during the build-up process, the material being the same as the material of the blank, for example, and then using a different material, for example for the radially exterior areas of the component.

In this way, it is also possible to generate a layer on individual parts or areas of the component by a build-up process, for example a wear protection coating.

Thus, due to this measure it is possible, for example, to realize a higher hardness of the component at wear surfaces of the component in a selective way. Hereby the service life of the component is increased. Regarding the impeller of a pump it is also in particular possible to do without a wear ring, which may be disposed on the impeller, and to replace the wear ring by a coating, generated by the build-up process. Although embodiments of the invention have been explained with reference to manufacturing or repairing, respectively, an impeller 1, the invention is, of course, not limited to such components 1 or their manufacturing or their repairing, respectively, but the invention is suitable for a plurality of other components 1, in particular for such components 1 where at least one inner channel 7 is provided, which geometry does not allow to elaborate that channel by machining or subtractively out of a blank 10 with a reasonable expenditure.

In particular, the component 1 can also be designed as an impeller or as a diffusor of a rotary machine, wherein the rotary machine can be in particular a pump or a turbine or a compressor or a compactor or an expander.

The inner channel can also be, for example, a cooling channel, e.g. in a turbine blade, for example a cooling air channel.

What is claimed:

1. A component of a rotary machine, comprising:
an impeller, a guide wheel or a diffusor of the rotary machine, the component extending in an axial direction and in a radial direction vertical thereto, and having at least one inner channel extending from a first end of a core of a center of the component, and to a second end at a radial limiting surface of the component and which is at least partially closed, the component being formed from a blank comprising the core of the component, the blank being limited by an outer surface in the radial direction, being subtractively processed in a first subtractive process step in such a manner, that an outer contour in an area of the outer surface is elaborated, the outer contour extending at least in the radial direction, and a part of the channel being manufactured, the part at least partially extends radially in the blank to the first end, and the channel being formed by a build-up process on the blank at an inlet of the component, so as to form first and second layers having different microstructures with a transition between the first and second layers, a portion of the second layer forming a portion of an external surface of the at least one inner passage.

2. The component of a rotary machine according to claim 1, wherein the component is part of a pump, a turbine, a compressor, a compactor or an expander.

3. The component of a rotary machine according to claim 1, wherein the outer contour comprises parts of a cover plate of the component or parts of a shroud of the component.

4. The component of a rotary machine according to claim 1, wherein the build-up process is performed layer by layer, at least in a direction vertical to the axial direction.

5. The component of a rotary machine according to claim 1, wherein the build-up process is additionally performed layer by layer in the axial direction.

6. The component of a rotary machine according to claim 1, wherein the build-up process is performed layer by layer in a peripheral direction extending at an angle relative to the radial direction.

7. The component of a rotary machine according to claim 1, wherein the at least one inner channel includes a plurality of inner channels, with each of the plurality of inner channels extending from the first end from the core of the component to the second end at the radial limiting surface of the component, and adjacent channels are respectively separated by a separating wall.

8. The component of a rotary machine according to claim 1, wherein the blank has a central bore before the first subtractive process step, the central bore being arranged radially inwardly such that in a finished state of the component, a first end of the channel arranged in the center is separated from the central bore by an annular body.

9. The component of a rotary machine according to claim 1, wherein the build-up process comprises several additive process steps to successively build up the component.

10. The component of a rotary machine according to claim 9, wherein at least one further subtractive process step is performed between the additive process steps.

11. The component of a rotary machine according to claim 1, wherein the component is built up part by part after the first subtractive process step.

12. The component of a rotary machine according to claim 1, wherein the build-up process is performed by a laser.

* * * * *